US011878798B2

(12) United States Patent
Atreya et al.

(10) Patent No.: US 11,878,798 B2
(45) Date of Patent: Jan. 23, 2024

(54) BLENDED WING BODY AIRCRAFT WITH A FUEL CELL AND METHOD OF USE

(71) Applicant: JETZERO, INC., Long Beach, CA (US)

(72) Inventors: Shailesh Atreya, Orange, CA (US); Ronald Tatsuji Kawai, Orange, CA (US)

(73) Assignee: JETZERO, INC., Long Beach, CA (US)

( * ) Notice: Subject to any disclaimer, the term of this patent is extended or adjusted under 35 U.S.C. 154(b) by 0 days.

(21) Appl. No.: 17/478,724

(22) Filed: Sep. 17, 2021

(65) Prior Publication Data

US 2023/0091929 A1 Mar. 23, 2023

(51) Int. Cl.
| | |
|---|---|
| B64C 39/10 | (2006.01) |
| B64D 27/24 | (2006.01) |
| B64D 37/04 | (2006.01) |
| B64D 37/30 | (2006.01) |
| B64D 41/00 | (2006.01) |

(52) U.S. Cl.
CPC .............. *B64C 39/10* (2013.01); *B64D 27/24* (2013.01); *B64D 37/04* (2013.01); *B64D 37/30* (2013.01); *B64C 2039/105* (2013.01); *B64D 2041/005* (2013.01); *B64D 2221/00* (2013.01)

(58) Field of Classification Search
CPC ... B64C 39/10; B64C 2039/105; B64D 27/24; B64D 37/04; B64D 37/06; B64D 37/30; B64D 2041/005; B64D 2221/00; Y02T 50/10; Y02T 50/60; Y02T 90/16
See application file for complete search history.

(56) References Cited

U.S. PATENT DOCUMENTS

| | | | | |
|---|---|---|---|---|
| 5,106,035 | A * | 4/1992 | Langford, III ......... | B64D 27/24 244/62 |
| 5,893,535 | A * | 4/1999 | Hawley .................... | B64C 3/00 244/119 |
| 5,909,858 | A * | 6/1999 | Hawley .................... | B64C 3/00 244/45 R |
| 6,347,719 | B1 * | 2/2002 | Rosen .................... | B64D 37/30 220/586 |
| 6,568,632 | B2 * | 5/2003 | Page ..................... | B64C 1/0009 244/36 |

(Continued)

FOREIGN PATENT DOCUMENTS

FR 3100798 A1 3/2021

OTHER PUBLICATIONS

Guynn, Evaluation of a Hydrogen Fuel Cell Powered Blended-Wing-Body Aircraft Concept for Reduced Noise and Emissions, Feb. 1, 2004.

(Continued)

*Primary Examiner* — Medhat Badawi
(74) *Attorney, Agent, or Firm* — Caldwell Intellectual Property Law

(57) ABSTRACT

Certain aspects relate to a blended wing body aircraft with a fuel cell and methods of use. An exemplary aircraft includes a blended wing body, at least a propulsor mechanically affixed to the aircraft and configured to propel the aircraft, at least a first fuel store configured to store a first fuel, and at least a fuel cell configured to combine the first fuel with oxygen to produce electricity.

18 Claims, 4 Drawing Sheets

(56) References Cited

U.S. PATENT DOCUMENTS

| | | | | |
|---|---|---|---|---|
| 6,568,633 B2* | 5/2003 | Dunn | B64D 27/24 | 244/59 |
| 6,572,053 B2* | 6/2003 | Salas | B60V 1/02 | 244/73 C |
| 6,666,406 B2* | 12/2003 | Sankrithi | B64C 39/04 | 244/119 |
| 6,923,403 B1* | 8/2005 | Dizdarevic | B64C 39/10 | 244/36 |
| 7,093,798 B2* | 8/2006 | Whelan | B64C 1/10 | 244/120 |
| 7,871,042 B2* | 1/2011 | Velicki | B64D 37/06 | 244/135 R |
| 8,353,478 B1* | 1/2013 | Kismarton | B64C 9/38 | 244/119 |
| 9,493,246 B2* | 11/2016 | Barmichev | B64D 37/04 | |
| 10,227,129 B2* | 3/2019 | Fisher | B64C 5/06 | |
| 10,414,484 B2* | 9/2019 | Moxon | B64C 3/52 | |
| D875,183 S * | 2/2020 | Alonso | D21/445 | |
| 10,773,817 B1* | 9/2020 | Brennen | B64D 33/02 | |
| 10,807,013 B2* | 10/2020 | Alonso | B64C 31/06 | |
| 10,946,962 B2* | 3/2021 | Banerjee | B64C 3/14 | |
| 11,613,356 B2* | 3/2023 | Banerjee | B64C 1/0009 | 244/36 |
| 11,697,500 B2* | 7/2023 | Whitlock | B64C 39/10 | 244/119 |
| 2004/0069897 A1* | 4/2004 | Corcoran | B64C 39/12 | 244/10 |
| 2004/0245382 A1* | 12/2004 | Nozaki | B64D 37/04 | 244/53 R |
| 2006/0219847 A1* | 10/2006 | Miller | B64C 23/00 | 244/130 |
| 2007/0237991 A1* | 10/2007 | Eichhorn | C22C 5/02 | 429/492 |
| 2008/0006743 A1* | 1/2008 | Miller | B64D 37/30 | 244/53 R |
| 2008/0230654 A1* | 9/2008 | Velicki | B64D 37/04 | 244/135 R |
| 2009/0212162 A1* | 8/2009 | Ward | B64D 37/04 | 244/135 R |
| 2010/0187237 A1* | 7/2010 | Brooks | F17C 1/12 | 220/660 |
| 2014/0174083 A1* | 6/2014 | Gerstler | F17C 9/04 | 60/671 |
| 2014/0175215 A1* | 6/2014 | Gallant | B64F 1/30 | 244/36 |
| 2015/0007585 A1* | 1/2015 | Kawai | B64D 37/30 | 62/48.2 |
| 2015/0307201 A1* | 10/2015 | Criado | B64D 41/00 | 244/58 |
| 2016/0111885 A1* | 4/2016 | Roques | H01H 33/02 | 29/428 |
| 2016/0236790 A1* | 8/2016 | Knapp | B64D 27/24 | |
| 2017/0029131 A1* | 2/2017 | Steinwandel | B64D 27/24 | |
| 2017/0081035 A1* | 3/2017 | Becker | B64D 29/00 | |
| 2018/0001999 A1* | 1/2018 | Page | B64C 25/14 | |
| 2018/0037327 A1* | 2/2018 | Hoffjann | B64D 41/00 | |
| 2018/0114995 A1* | 4/2018 | Stoia | H01M 8/04225 | |
| 2018/0178920 A1* | 6/2018 | Swann | F02K 5/00 | |
| 2018/0291807 A1* | 10/2018 | Dalal | F02C 7/32 | |
| 2018/0334254 A1* | 11/2018 | Saint-Marc | B64D 11/003 | |
| 2019/0135424 A1* | 5/2019 | Baity | B64C 29/0033 | |
| 2019/0322379 A1* | 10/2019 | Mackin | F02C 7/057 | |
| 2019/0322382 A1* | 10/2019 | Mackin | B64D 27/24 | |
| 2019/0323426 A1* | 10/2019 | Mackin | B64D 27/10 | |
| 2019/0323427 A1* | 10/2019 | Mackin | B64D 27/24 | |
| 2019/0344898 A1* | 11/2019 | Scothern | B64D 27/14 | |
| 2019/0382123 A1* | 12/2019 | Schwarz | F02C 6/20 | |
| 2020/0254900 A1* | 8/2020 | Kumar | H02P 5/74 | |
| 2020/0290742 A1* | 9/2020 | Kumar | B64D 27/24 | |
| 2020/0307789 A1* | 10/2020 | Princen | B64D 33/02 | |
| 2020/0407060 A1* | 12/2020 | Hosseini | B64C 15/00 | |
| 2021/0222629 A1* | 7/2021 | Terwilliger | B64D 27/24 | |
| 2021/0254507 A1* | 8/2021 | Tejero Embuena | F02C 7/04 | |
| 2022/0001974 A1* | 1/2022 | Page | B64D 9/00 | |
| 2022/0042465 A1* | 2/2022 | Swann | F02C 9/00 | |
| 2022/0052361 A1* | 2/2022 | Morrison | B60L 50/72 | |
| 2022/0055762 A1* | 2/2022 | Clarke | F04D 25/06 | |
| 2022/0063819 A1* | 3/2022 | Murrow | B64D 27/24 | |
| 2022/0131165 A1* | 4/2022 | Ballantine | B01D 53/02 | |
| 2022/0275733 A1* | 9/2022 | Hollingshead | B64D 33/02 | |
| 2022/0388633 A1* | 12/2022 | Page | B64C 25/14 | |
| 2023/0092281 A1* | 3/2023 | Rawdon | B64C 17/10 | 244/135 C |
| 2023/0143459 A1* | 5/2023 | Clark | B64D 27/26 | 244/7 R |

OTHER PUBLICATIONS

Airbus, These new Airbus concept aircraft have one thing in common, Sep. 21, 2020.

Kleemann, Conceptual Design and Optimization of a Solar-Electric Blended Wing Body Aircraft for General Aviation, Jan. 31, 2020.

* cited by examiner

BLENDED WING BODY AIRCRAFT WITH A FUEL CELL AND METHOD OF USE

FIELD OF THE INVENTION

The present invention generally relates to the field of aircraft. In particular, the present invention is directed to a blended wing body aircraft with a fuel cell and method of use.

BACKGROUND

Human flight is a large contributor of greenhouse gases, the effects of which are compounded by their release high in the atmosphere. However, non-greenhouse gas generating energy storage methods are less energy dense, according to one or both of volumetric energy density and weight energy density. Presently, current aircraft designs are tightly constrained in both storage volume and weight.

SUMMARY OF THE DISCLOSURE

In an aspect a blended wing body aircraft with a fuel cell includes a blended wing body, at least a first fuel store located within a transitional portion of the blended wing body and configured to store a first fuel, at least a fuel cell configured to combine the first fuel with oxygen to produce electricity, at least a second fuel store located within a wing portion of the blended wing body and configured to store a second fuel, and at least a propulsor mechanically affixed to the aircraft and configured to propel the blended wing body aircraft.

In another aspect a method of use of a blended wing body aircraft with a fuel cell includes storing a first fuel, using at least a first fuel store located within a transitional portion of a blended wing body of the blended wing body aircraft, combining the first fuel with oxygen to produce electricity, using at least a fuel cell, storing a second fuel, using at least a second fuel store located within a wing portion of the blended wing body, and propelling the aircraft, using at least a propulsor mechanically affixed to the blended wing body aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for using a fuel cell within a blended wing body aircraft (i.e., blended wing aircraft). In an embodiment, a blended wing aircraft allows for an increase in volumetric storage space allowing of use of liquid hydrogen fuel, which has less energy per unit volume than conventional aircraft fuel.

Aspects of the present disclosure can be used to power aircraft propulsors using a fuel cell. Aspects of the present disclosure can also be used to power an auxiliary power system using a fuel cell.

Aspects of the present disclosure allow for use of non-greenhouse gas emitting fuels to power human flight. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1. Furthermore, there is no intention to be bound by any expressed or implied theory presented in this disclosure.

Figure 1:
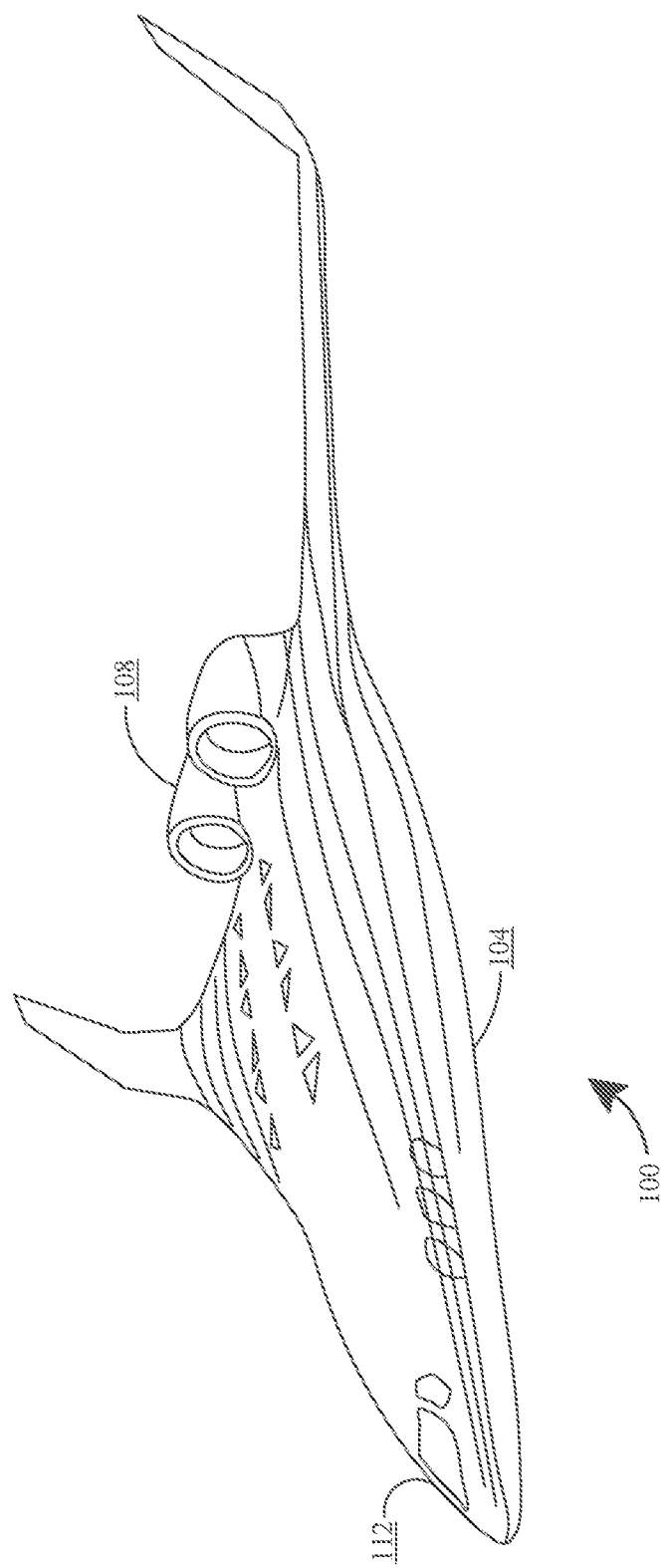
FIG. 1 is a schematic illustration of an exemplary blended wing body aircraft with a fuel cell.

Referring to FIG. 1, an exemplary aircraft 100 is illustrated. Aircraft 100 may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear demarcation between wings and a main body of the aircraft at a leading edge of the wings. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage 116. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contain an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, paddle wheels, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

With continued reference to FIG. 1, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude", for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of an aircraft 100.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component may include any propulsor as described herein. In embodiment, at least a flight component 10S may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

In some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

Wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 212 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied. In some cases, oxygen may be provided by way of ambient or atmospheric air. Alternatively or additionally, in some cases, aircraft 100 may additionally include at least an oxygen tank configured to store oxygen for use with fuel cell. In some cases, oxygen may be stored within at least an oxygen tank in a gaseous state.

With continued reference to FIG. 1, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance, or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1, aircraft 100 may include multiple flight component 108 sub-systems, each of which may have a separate energy source. For instance, and without limitation, one or more flight components may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors 10S. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, aircraft 100 may include a flight component 108 that includes at least a nacelle. For the purposes of this disclosure, a "nacelle" is a streamlined body housing, which is sized according to that which is houses, such as without limitation an engine, a fuel store, or a flight component. When attached by a pylon entirely outside an airframe 104 a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1, in nonlimiting embodiments, flight component 108 may include an air-breathing engine such as a jet engine, turbojet engine, turboshaft engine, ramjet engine, scramjet engine, hybrid propulsion system, turbofan engine, or the like. Flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 2:
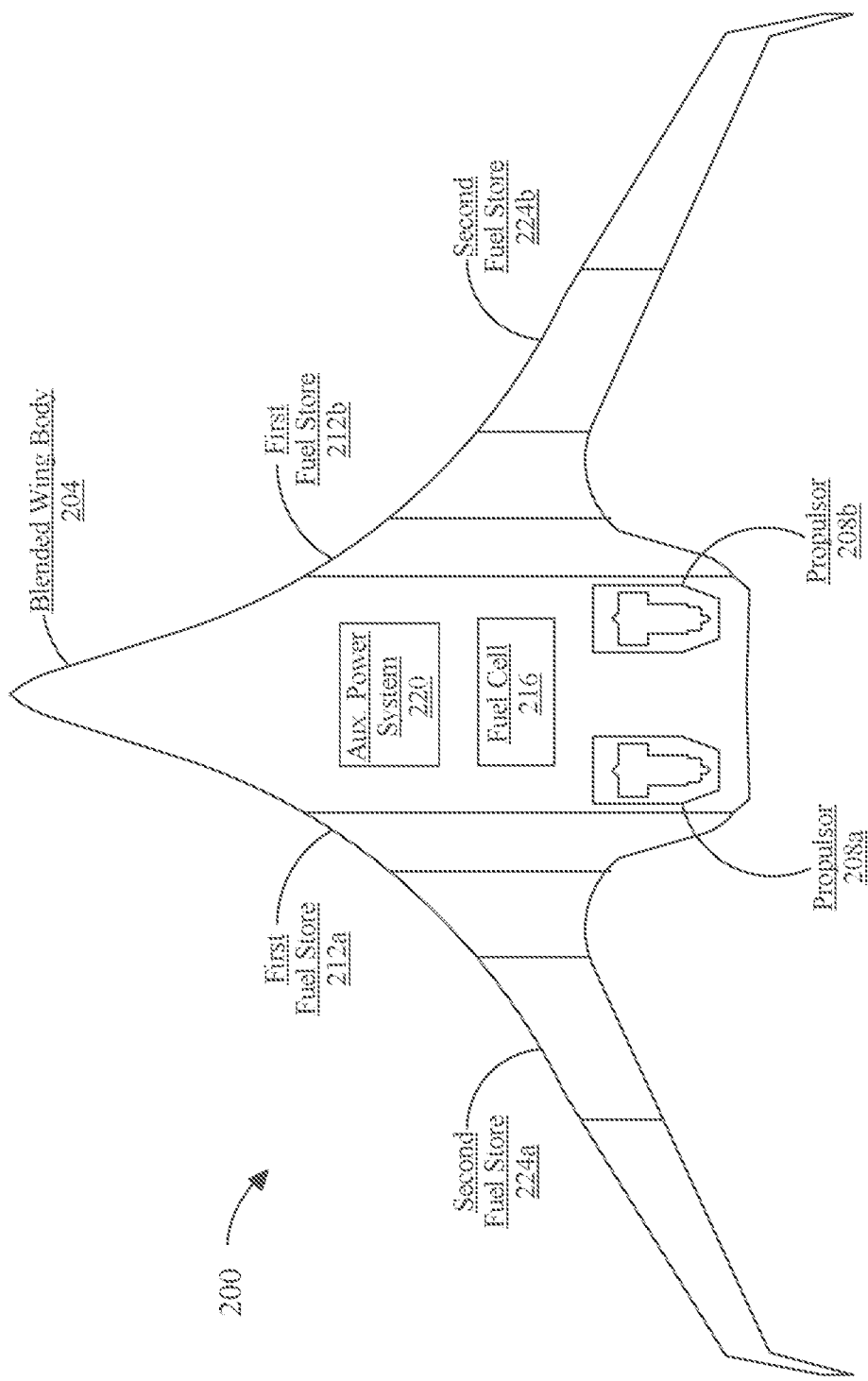
FIG. 2 is a diagram of an exemplary blended wing body aircraft with a fuel cell.

Referring now to FIG. 2, an exemplary top-down diagram of an exemplary blended wing aircraft 200 is illustrated. Aircraft 200 may include a blended wing body 204. As described above, a blended wing body (BWB) is a fixed-wing aircraft body having no clear demarcation between wings and a main body of the aircraft. For example, a BWB 204 aircraft may have distinct wing and body structures, which are smoothly blended together with no clear dividing line or boundary feature between wing and fuselage. As used in this disclosure, a "transitional" portion of blended wing body 204 is the portion of the blended wing body 204 that includes the aircraft body between wing and a main body.

With continued reference to FIG. 2, aircraft 200 may include at least a propulsor 208a-b mechanically affixed to the aircraft 200. In some cases, at least a propulsor 208a-b may be configured to propel aircraft 200. Propulsor may include any propulsor described in this disclosure, for example with reference to FIG. 1. In some embodiments, at least a propulsor 208a-b may include at least a combustion engine that burns first fuel and produces mechanical work. Resulting mechanical work may be used to power at least a propulsor 208a-b. In some embodiments, at least a propulsor 208a-b may include at least an electric motor operatively connected with fuel cell 216. Propulsor 208a-b may be operatively connected to fuel cell 216 by way of electrical communication, for example through one or more conductors. In some cases, at least a fuel cell 216 may be configured to power at least an electric motor of propulsor 208a-b. In some embodiments, at least a propulsor 208a-b may include both a combustion engine and an electric motor.

With continued reference to FIG. 2, aircraft 200 may include at least a first fuel store 212a-b. At least a first fuel store 212a-b may be configured to store a first fuel. First fuel may include any fuel taught in this disclosure, for example without limitation liquid hydrogen, liquid natural gas, gasoline-based fuels, kerosene-based fuels and the like. In some embodiments, first fuel store 212a-b may be at least partially located within a transitional portion of blended wing body 204. According to some embodiments, first fuel store may be configured to store one or more of liquid hydrogen and natural gas. For example, although weight energy density of liquid hydrogen is high, volume energy density of liquid hydrogen is lower than conventional aviation fuels. For this reason, in some cases, fuel store 212a-b may be located within a transitional portion of blended wing body 204 as greater volume for storage is available here, for example when compared to a wing portion. In some cases, liquid nitrogen may need to be stored at extremely cold temperatures, for instance without limitation at a temperature below −252° C. As liquid hydrogen warms it boils off and is lost. As a result, boil off rate is considered when employing liquid hydrogen as a fuel. In some cases, first fuel store 212, or any fuel store containing liquid hydrogen, may be heavily insulated. For example, in some cases, fuel store may include an inner wall and an outer wall with a vacuum chamber disposed between the inner wall and the outer wall. Vacuum within vacuum chamber prevents convective and conductive heat loss between inner and outer wall, so that substantially only radiative heat transfer may be possible between the two walls dramatically slowing heat transfer (and heating). Alternatively or additionally, in some cases, an Insulation may be located between inner wall and outer wall of fuel store. Exemplary non-limiting insulations include high loft materials, silica aerogel, polyurethane, polystyrene, fiberglass, and the like. In some cases, a reflective material may be used within a wall of fuel store to slow radiative heat transfer, for example without limitation metallic materials with high polish like foil.

In some cases, a voluminous fuel store 212a-b, for instance located within a transitional portion of blended wing body 204, may be advantageous for liquid hydrogen (or liquid natural gas) storage as it slows a rate of temperature rise of fuel. For instance, heat transfer is a function of surface area of fuel store and may be understood according to Newton's Law of Cooling. Whereas, thermal compliance is a function of mass (volume multiplied by density). As a fuel store increases in size, its volume increases more than surface area. This phenomenon may be understood as square-cube law, stated thus when an object undergoes a proportional increase in size, its new surface area is proportional to the square of the multiplier and its new volume is proportional to the cube of the multiplier. For example, imagine a cubic fuel store increases from a first length, $l_1$, to a second length, $l_2$. An area of fuel store may increase thus:

$$A_2 = A_1 \left(\frac{l_2}{l_1}\right)^2$$

and, a volume of fuel store increases thus $$V_2 = V_1 \left(\frac{l_2}{l_1}\right)^3$$

where $A_1$ is first surface area, $A_2$ is second surface area, $V_1$ is first volume, and $V_2$ is second volume. For example, a cube with a side length of 1 meter has a surface area of 6 m² and a volume of 1 m³. If dimensions of cube were multiplied by 2, its surface area would be multiplied by the square of 2 and become 24 m². Its volume would be multiplied by cube of 2 and become 8 m³. The original cube (1 m sides) has a surface area to volume ratio of 6:1. The larger (2 m sides) cube has a surface area to volume ratio of (24/8) 3:1. As dimensions increase, volume will continue to grow faster than surface area. Square-cube principle applies to all solids, not just cubes.

With continued reference to FIG. 2, aircraft 200 may include at least a fuel cell 216. In some cases, at least a fuel cell 216 may be configured to combine first fuel with an oxidizing agent, such as oxygen to produce electricity. At least a fuel cell 216 may include any fuel cell described in this disclosure, including without limitation with reference to FIG. 1 above.

Still referring to FIG. 2, in some embodiments aircraft 200 may additionally include an auxiliary power system 220 operatively connected with at least a fuel cell 216. As used in this disclosure, an "auxiliary power system" is a power system, such as without limitation an electrical circuit or mechanical power source, that provides electrical energy to non-propulsor flight components of an aircraft. Exemplary non-limiting non-propulsor flight component include an avionic system, a flight control system, an environmental control system, and anti-ice system, a lighting system, a fuel system, a braking system, and/or a landing gear system. Auxiliary power system 220 may be operatively connected to fuel cell 216 by way of electrical communication, for example through one or more conductors. In some cases, at least a fuel cell 216 may be configured to power auxiliary power system 220. In some cases, auxiliary power system 220 may include a motor configured to convert electric energy to mechanical work. In some cases, motor may be used to operate a compressor, for instance of air conditioning or refrigeration system. In some cases, auxiliary power system 220 may include a motor that is configured to start a combustion engine of at least a propulsor 208a-b.

Still referring to FIG. 2, in some embodiments, aircraft 200 may additionally include a second fuel store 224a-b. In some cases, second fuel store 224a-b may be configured to store a second fuel. In some cases, second fuel may be different than a first fuel. Second fuel may include any fuel described in this disclosure, including without limitation kerosene-based fuels. In some cases, at least a propulsor 208a-b may include at least a combustion engine configured to burn second fuel thereby producing mechanical work, which is used to power the at least a propulsor 208a-b.

Still referring to FIG. 2, in some embodiments, one or more of first fuel store 212a-b and second fuel store 224a-b may include at least a fuel environment control mitigation. As used in this disclosure, a "fuel environment mitigation" is any design parameter selected to control an environmental factor associated with fuel within a fuel store. In some cases, fuel environment control mitigation may include a design parameter that affects one or more of fuel pressure, fuel temperature, fuel phase, and the like. For example, in some cases, a fuel environment control mitigation may include insulation to control fuel temperature. Additionally or alternatively, in some cases, fuel environment control mitigation may include a pressure vessel within which fuel pressure may be controlled.

Figure 3:
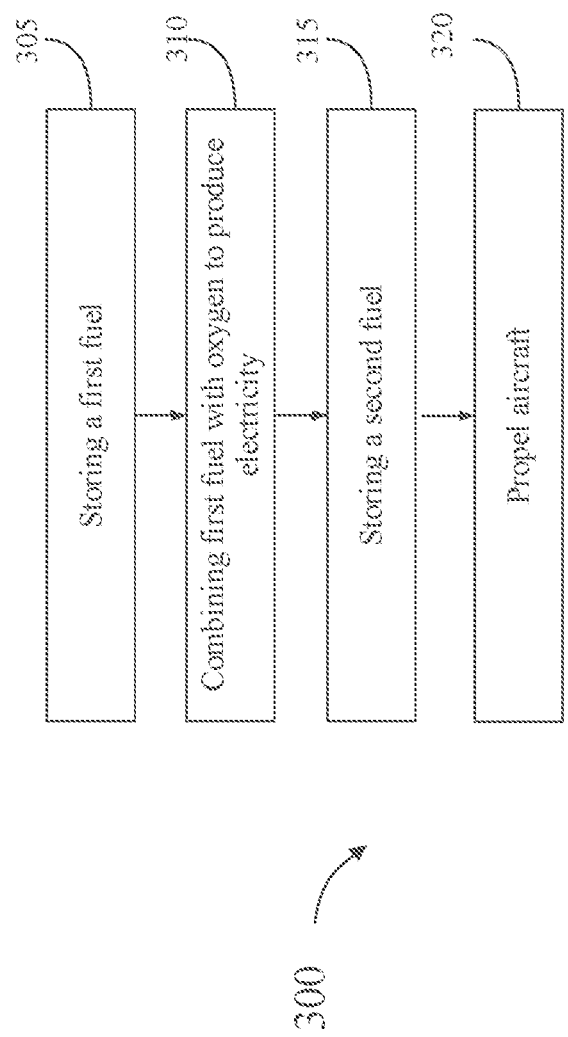
FIG. 3 is a flow diagram illustrating an exemplary method of use of an exemplary blended wing body aircraft.

Referring now to FIG. 3, a method 300 of use for a blended wing body aircraft with a fuel cell is illustrated by way of a flow diagram. At step 305, method 300 may include storing a first fuel, using at least a first fuel store. First fuel may include any fuel described in this disclosure, for example with reference to FIGS. 1-2. First fuel store may include any fuel store described in this disclosure, for example with reference to FIGS. 1-2. In some embodiments, first fuel may include one or more of liquid hydrogen and natural gas. In some embodiments, first fuel store may be at least partially located within a transitional portion of blended wing body. In some embodiments, first fuel store may include at least a fuel environment control mitigation.

With continued reference to FIG. 3, at step 310, method 300 may include combining first fuel with an oxidizing agent to produce electricity, using at least a fuel cell. Fuel cell may include any fuel cell described in this disclosure, for example with reference to FIGS. 1-2. Oxidizing agent may include any oxidizing agent, such as without limitation oxygen, described in this disclosure, for example with reference to FIGS. 1-2.

With continued reference to FIG. 3, at step 315, method 300 may include storing a second fuel store, using at least a second fuel store located within a wing portion of the blended wing body. At least a second fuel store may include any fuel store described in this disclosure, including with reference to FIGS. 1-2. In some embodiments, second fuel may include one or more of a gasoline based fuel and a kerosene based fuel.

With continued reference to FIG. 3, at step 320, method 300 may include propelling aircraft, using at least a propulsor mechanically affixed to the aircraft, wherein the aircraft has a blended wing body. Propulsor may include any propulsor described in this disclosure, for example with reference to FIGS. 1-2. Blended wing body may include any blended wing body described in this disclosure, for example with reference to FIGS. 1-2.

Still referring to FIG. 3, in some embodiments, method 300 may additionally include burning, using at least a combustion engine of at least a propulsor, second fuel, and producing, using the at least a combustion engine, mechanical work which is used to power the at least a propulsor. Combustion engine may include any combustion engine described in this disclosure, for example with reference to FIGS. 1-2.

Still referring to FIG. 3, in some embodiments, method 300 may additionally include powering, using at least a fuel cell, at least an electric motor of at least a propulsor, operatively connected with the at least a fuel cell. Electric motor may include any electric motor described in this disclosure, for example with reference to FIGS. 1-2.

Still referring to FIG. 3, in some embodiments, method 300 may additionally include burning, using at least a combustion engine of at least a propulsor, second fuel; producing, using the at least a combustion engine, mechanical work which is used to power the at least a propulsor; and powering, using at least a fuel cell, at least an electric motor of the at least a propulsor, operatively connected with the at least a fuel cell.

Still referring to FIG. 3, in some embodiments, method 300 may additionally include powering, using at least a fuel cell, an auxiliary power system operatively connected with the at least a fuel cell. Auxiliary power system may include any auxiliary power system described in this disclosure, for example with reference to FIGS. 1-2. In some cases, method 300 may further include powering, using auxiliary power system, one or more of an avionic system, a flight control system, an environmental control system, and anti-ice system, a lighting system, a fuel system, a braking system, and a landing gear system.

Still referring to FIG. 3, in some embodiments, method 300 may additionally include storing, using a second fuel store, a second fuel, burning, using at least a combustion engine of at least a propulsor, the second fuel, and producing, using the at least a combustion engine, mechanical work which is used to power the at least a propulsor. Second fuel may include any fuel described in this disclosure, for example with reference to FIGS. 1-2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
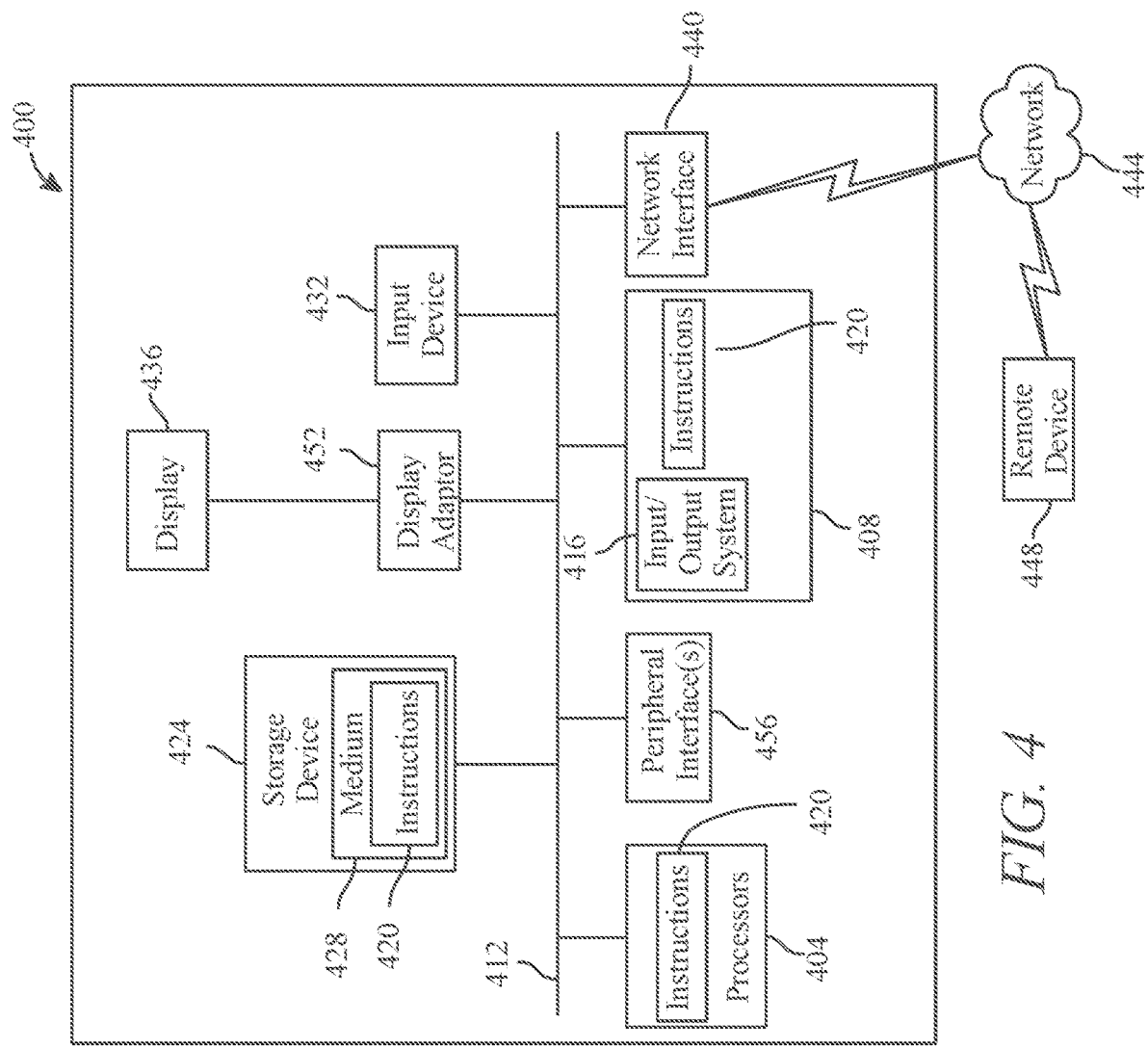
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body aircraft with a fuel cell, the aircraft comprising:
    a blended wing body aircraft;
    at least a first fuel store located within a transitional portion of the blended wing body aircraft and configured to store a first fuel, wherein the at least a first fuel store comprises a fuel environment mitigation configured to regulate the temperature and pressure of the first fuel, wherein the fuel environment mitigation comprises an insulation, wherein the insulation comprises a vacuum chamber disposed between an inner wall of the at least a first fuel store and an outer wall of the at least a first fuel store, and a pressure vessel wherein the pressure vessel is further configured to control fuel pressure;
    at least a fuel cell configured to combine the first fuel with oxygen to produce electricity;
    at least a second fuel store located within the blended wing body aircraft and configured to store a second fuel wherein the at least a second fuel store comprises a second environment mitigation configured to regulate the temperature and pressure of the second fuel, wherein the second fuel environment mitigation comprises a second insulation, wherein the second insulation comprises a second vacuum chamber disposed between an inner wall of the at least a second fuel store and an outer wall of the at least a second fuel store, and a second pressure vessel wherein the second pressure vessel is further configured to control a second fuel pressure;
    an auxiliary power system operatively connected with the at least a fuel cell, wherein the at least a fuel cell is configured to power the auxiliary power system, wherein the auxiliary power system is configured to power an anti-ice system and a braking system while in flight;
    at least a propulsor mechanically affixed to an upper aft surface of the blended wing body aircraft and configured to propel the blended wing body aircraft; and
    at least a nacelle configured to encapsulate the at least a propulsor.

2. The aircraft of claim 1, wherein the first fuel comprises one or more of liquid hydrogen and natural gas.

3. The aircraft of claim 1, wherein the second fuel comprises one or more of a kerosene based fuel and a gasoline based fuel.

4. The aircraft of claim 1, wherein the at least a propulsor comprises at least a combustion engine that burns the second fuel and produces mechanical work which is used to power the at least a propulsor.

5. The aircraft of claim 1, wherein the at least a propulsor comprises at least an electric motor operatively connected with the at least a fuel cell, and wherein the at least a fuel cell is configured to power the at least an electric motor.

6. The aircraft of claim 1, wherein the at least a propulsor comprises:
    at least a combustion engine that burns the second fuel and produces mechanical work which is used to power the at least a propulsor; and
    at least an electric motor operatively connected with the at least a fuel cell; and wherein the at least a fuel cell is configured to power the at least an electric motor.

7. The aircraft of claim 1, wherein the auxiliary power system is configured to power one or more of an avionic system, a flight control system, an environmental control system, a lighting system, a fuel system, a braking system, and a landing gear system.

8. The aircraft of claim 1, wherein the at least a propulsor comprises a combustion engine and the auxiliary power system is further configured to start the internal combustion engine.

9. The aircraft of claim 1, wherein the at least a second fuel store is located within a wing portion of the blended wing body.

10. A method of use of a blended wing body aircraft with a fuel cell, the method comprising:
    storing a first fuel, using at least a first fuel store located within a transitional portion of a blended wing body of the blended wing body aircraft, wherein the at least a first fuel store comprises a fuel environment mitigation configured to regulate the temperature and pressure of the first fuel, wherein the fuel environment mitigation comprises an insulation, wherein the insulation comprises a vacuum chamber disposed between an inner wall of the at least a first fuel store and an outer wall of the at least a first fuel store, and a pressure vessel wherein the pressure vessel is further configured to control fuel pressure;
    combining the first fuel with oxygen to produce electricity, using at least a fuel cell;

storing a second fuel, using at least a second fuel store located within the blended wing body, wherein the at least a second fuel store comprises a second environment mitigation configured to regulate the temperature of the second fuel, wherein the second fuel environment mitigation comprises a second insulation, wherein the second insulation comprises a second vacuum chamber disposed between an inner wall of the at least a second fuel store and an outer wall of the at least a second fuel store, and a second pressure vessel wherein the second pressure vessel is further configured to control a second fuel pressure;

powering, using the at least a fuel cell, an auxiliary power system operatively connected with the at least a fuel cell, wherein the auxiliary power system is configured to power an anti-ice system and a braking system while in flight; and propelling the blended wing body aircraft, using at least a propulsor mechanically affixed to an upper aft surface the blended wing body aircraft, wherein the at least a propulsor is encapsulated by at least a nacelle.

11. The method of claim 10, wherein the first fuel comprises one or more of liquid hydrogen and natural gas.

12. The method of claim 10, wherein the second fuel comprises one or more of a kerosene based fuel and a gasoline based fuel.

13. The method of claim 10, further comprising:
burning, using at least a combustion engine of the at least a propulsor, the second fuel; and
producing, using the at least a combustion engine, mechanical work which is used to power the at least a propulsor.

14. The method of claim 10, further comprising:
powering, using the at least a fuel cell, at least an electric motor of the at least a propulsor, operatively connected with the at least a fuel cell.

15. The method of claim 10, further comprising:
burning, using at least a combustion engine of the at least a propulsor, the second fuel;
producing, using the at least a combustion engine, mechanical work which is used to power the at least a propulsor; and
powering, using the at least a fuel cell, at least an electric motor of the at least a propulsor, operatively connected with the at least a fuel cell.

16. The method of claim 10, further comprising:
powering, using the auxiliary power system, one or more of an avionic system, a flight control system, an environmental control system, a lighting system, a fuel system, a braking system, and a landing gear system.

17. The method of claim 10, further comprising:
starting, using the auxiliary power unit, a combustion engine of the at least a propulsor.

18. The method of claim 10, wherein the at least a second fuel store is located within a wing portion of the blended wing body.

* * * * *